(12) United States Patent
Shimomaki et al.

(10) Patent No.: US 8,531,574 B2
(45) Date of Patent: Sep. 10, 2013

(54) DISPLAY DEVICE AND CAMERA

(75) Inventors: Shinichi Shimomaki, Akishima (JP); Hiromitsu Ishii, Mitaka (JP)

(73) Assignee: Casio Computer Co., Ltd., Tokyo (JP)

( * ) Notice: Subject to any disclaimer, the term of this patent is extended or adjusted under 35 U.S.C. 154(b) by 237 days.

(21) Appl. No.: 13/022,642

(22) Filed: Feb. 8, 2011

(65) Prior Publication Data
US 2011/0199528 A1 Aug. 18, 2011

(30) Foreign Application Priority Data

Feb. 15, 2010 (JP) .................................. 2010-030512
Dec. 20, 2010 (JP) .................................. 2010-283517

(51) Int. Cl.
*H04N 5/222* (2006.01)

(52) U.S. Cl.
USPC ............. 348/333.01; 348/333.03; 348/333.05

(58) Field of Classification Search
USPC ........................ 348/333.01–333.09; 396/296
See application file for complete search history.

(56) References Cited

U.S. PATENT DOCUMENTS

| 7,929,098 B2 | 4/2011 | Koishi | |
|---|---|---|---|
| 2010/0097564 A1 | 4/2010 | Koishi | |
| 2011/0019061 A1* | 1/2011 | Akiba et al. | ............. 348/333.01 |
| 2011/0267568 A1 | 11/2011 | Fukuchi et al. | |

FOREIGN PATENT DOCUMENTS

| JP | 57-109977 A | 7/1982 |
|---|---|---|
| JP | 5-107556 A | 4/1993 |
| JP | 09-258179 A | 10/1997 |
| JP | 10-91099 A | 4/1998 |
| JP | 11-337960 A | 12/1999 |
| JP | 2001-125086 A | 5/2001 |
| JP | 2002-072333 A | 3/2002 |
| JP | 2003-270657 A | 9/2003 |
| JP | 2007-133088 A | 5/2007 |
| JP | 2008-009386 A | 1/2008 |
| JP | 2011-248334 A | 12/2011 |
| KR | 10-2007-0058257 A | 6/2007 |
| KR | 10-2007-0115763 A | 12/2007 |
| WO | WO 2008/105395 A1 | 9/2008 |
| WO | WO 2009/119865 A1 | 10/2009 |

OTHER PUBLICATIONS

Korean Office Action dated Jul. 17, 2012 (and English translation thereof) in counterpart Korean Application No. 10-2011-0012757.
Japanese Office Action dated Jan. 10, 2012 (and English translation thereof) in counterpart Japanese Application No. 2010-283517.
Japanese Office Action dated Apr. 16, 2013 (and English translation thereof) in counterpart Japanese Application No. 2012-052381.

* cited by examiner

*Primary Examiner* — Yogesh Aggarwal
(74) *Attorney, Agent, or Firm* — Holtz, Holtz, Goodman & Chick, PC

(57) ABSTRACT

A display device includes a liquid crystal layer between transparent first and second substrates. A transparent first segment electrode is formed on the first substrate so that a predetermined area becomes a positive pattern with respect to a predetermined display information, and a transparent second segment electrode is formed on the first substrate so that a predetermined area becomes a negative pattern with respect to the display information. The first and second segment electrodes are formed as a same first layer. A transparent common electrode is formed on the second substrate facing the first and second segment electrodes. A transparent auxiliary electrode is formed as a second layer on the first substrate along a gap between the first and second segment electrodes. The auxiliary electrode is connected to the second segment electrode via a contact hole in an insulating film interposed between the first and second layers.

18 Claims, 11 Drawing Sheets

DISPLAY DEVICE AND CAMERA

CROSS-REFERENCE TO RELATED APPLICATIONS

This application is based upon and claims the benefit of priority from prior Japanese Patent Applications No. 2010-030512, filed Feb. 15, 2010; and No. 2010-283517, filed Dec. 20, 2010, the entire contents of both of which are incorporated herein by reference.

BACKGROUND OF THE INVENTION

1. Field of the Invention

The present invention relates to a display device using polymer dispersed liquid crystal as a liquid crystal layer, and to a camera using the display device.

2. Description of the Related Art

A liquid crystal panel is used as an image display unit for various usages because the panel has features such as thinness and low power consumption. A twist nematic mode has been known as a general alignment mode of a liquid crystal layer in a liquid crystal panel. A liquid crystal panel of the foregoing alignment mode has a structure in which a liquid crystal layer is held between two polarizers in order to control a quantity of light transmitting through a liquid crystal panel. However, there is a problem that the polarizer has a high light absorption factor; as a result, a light available efficiency is low.

In order to solve the foregoing problem, the following liquid crystal panel has attracted interest as a liquid crystal panel which has no need to provide a polarizer for controlling a quantity of transmitted light. In the liquid crystal panel, for example, polymer dispersed liquid crystal such as a polymer network (hereinafter, referred to simply as PN) liquid crystal disclosed in Jpn. Pat. Appln. KOKAI Publication No. 2003-270657 is used as a liquid crystal layer. PN liquid crystal is formed by dispersing liquid crystal in polymer such as PN. The liquid crystal panel using the foregoing PN liquid crystal as a liquid crystal layer changes the alignment state of a liquid crystal molecule between the following two states. One is a state in which a degree of light scattering becomes high, and the other is a state in which a degree of light scattering is reduced. In this way, it is possible to control the quantity of light transmitting through a liquid crystal panel toward a predetermined direction.

FIG. 20 is a view to explain an alignment state of a liquid crystal molecule when a degree of light scattering of a liquid crystal layer is high (light scattering state) in a liquid crystal panel using a PN liquid crystal as a liquid crystal layer. FIG. 21 is a view to explain an alignment state of a liquid crystal molecule when a degree of light scattering of a liquid crystal layer is reduced (light non-scattering state) in a liquid crystal panel using a PN liquid crystal as a liquid crystal layer (the case where a dielectric constant anisotropy of a liquid crystal molecule is positive).

A liquid crystal panel using a PN liquid crystal as a liquid crystal layer has a first substrate 51 formed of a transparent insulating material such as glass and a second substrate 53 formed of the same material as above. For example, a conductive film formed of a transparent conductive material such as indium tin oxide (ITO) is provided as a display electrode 52 on the first substrate 51. Moreover, a conductive film formed of a transparent conductive material such as ITO is provided as a common electrode 54 on the second substrate 53. The first substrate 51 is stuck to the second substrate 53 via a gap material (seal) so that the display electrode 52 faces the common electrode 54 and a predetermined gap is formed between the first and second substrates 51 and 53. In the gap between the first and second substrates 51 and 53, PN liquid crystal in which liquid crystal molecules 56 are dispersed in PN is sealed to form a liquid crystal layer.

The potential of the display electrode 52 and the potential of the common electrode 54 are set to an equal potential, and thereby, control is carried out so that a voltage applied to a liquid crystal layer formed of PN liquid crystal becomes 0V. In this case, as can be seen from FIG. 20, liquid crystal molecules 56 dispersed in the ON 55 are in an alignment state of being turned to an arbitrary direction at random. When light 57 passes through a liquid crystal layer of the foregoing alignment state, the light 57 passes through a plurality of regions having a mutually different refractive index. For this reason, the light 57 passes through the liquid crystal layer while being dispersed. Therefore, a scattering degree of light transmitting through the liquid crystal panel becomes high; as a result, the liquid crystal panel is visible as a cloudy state (dark state). The foregoing PN 55 reduces an alignment regular force between liquid crystal molecules 56 so that the alignment of liquid crystal molecules is made at random. Namely, the PN 55 acts so that a degree of light scattering becomes high.

Conversely, the potential of the display electrode 52 and the potential of the common electrode 54 are set to a mutually different potential, and thereby, control is carried out so that a voltage applied to a liquid crystal layer formed of ON liquid crystal becomes sufficiently high. In this case, as can he seen from FIG. 21, liquid crystal molecules 56 are in an alignment state in which their parallel direction is uniquely arranged to the thickness direction of the liquid crystal layer. In the liquid crystal layer of the foregoing alignment state, a refractive index becomes unique in the liquid crystal layer. Therefore, a degree of scatting of the light 57 transmitting through the liquid crystal layer is reduced. As a result, the liquid crystal panel is visible as a transparent state. In order to improve a transparent state, the refractive index of PN 55 is set to become equal to an apparent refractive index of liquid crystal molecules in the foregoing state.

As described above, the liquid crystal panel using PN liquid crystal as a liquid crystal layer has the following features. Namely, the alignment of liquid crystal molecules dispersed in PN 55 is changed between the following two states by controlling each potential of display electrode 52 and common electrode 54 arranged via a liquid crystal layer. One is a state in which a degree of light scattering becomes high, and the other is a state in which a degree of light scattering is reduced. Therefore, it is possible to control a quantity of light transmitting through a liquid crystal panel toward a predetermined direction.

If a liquid crystal panel is provided with a plurality of segments, a display area of a first substrate is provided with a plurality of segment electrodes functioning as a display electrode. First and second substrate are arranged so that these segment electrodes commonly orient with respect to one common electrode, which is formed on the entire surface of a second substrate. Moreover, each of segment electrodes is formed so that the potential is individually set. A liquid crystal layer of a region corresponding to one segment electrode is defined as one segment. A voltage applied to a liquid crystal layer is controlled for each segment.

As described above, a plurality of segments is provided, and polymer dispersed liquid crystal is used as a liquid crystal layer. However, in this case, there is a problem that a gap between neighboring two segment electrodes is visible as a cloudy region (dark region).

BRIEF SUMMARY OF THE INVENTION

The present invention has been made in view of the foregoing conventional problem. An object of the invention is to provide a display device and a camera, which can prevent a gap between neighboring two segment electrodes from being visible as a dark region even if polymer dispersed liquid crystal is used as a liquid crystal layer.

One of aspects of a display device according to the present invention includes:
  a transparent first substrate;
  a transparent second substrate;
  a liquid crystal layer which is formed of a polymer dispersed liquid crystal held between the first substrate and the second substrate;
  a transparent first segment electrode which is formed on the first substrate so that a predetermined area becomes a positive pattern with respect to a predetermined display information;
  a transparent second segment electrode which is formed on the first substrate so that a predetermined area becomes a negative pattern with respect to the predetermined display information, wherein the transparent second segment electrode is formed as a same first layer as the first segment electrode;
  a transparent common electrode which is formed on the second substrate to face the first and second segment electrodes;
  a transparent auxiliary electrode which is formed as a second layer different from the first layer on the first substrate along a gap between the first and second segment electrodes; and
  a transparent insulating film interposed between the first and second layers,
  wherein the auxiliary electrode is connected to the second segment electrode via a contact hole formed in the insulating film.

One of other aspects of a display device according to the present invention includes:
  a transparent first substrate;
  a transparent second substrate;
  a liquid crystal layer which is formed of a polymer dispersed liquid crystal held between the first substrate and the second substrate;
  a transparent first segment electrode which is formed on the first substrate;
  a transparent second segment electrode which is formed on the first substrate and is formed as a same first layer as the first segment electrode;
  a transparent common electrode which is formed on the second substrate to face the first and second segment electrodes;
  a transparent auxiliary electrode which is formed on the first substrate along a gap between the first and second segment electrodes; and
  a control circuit which sets a potential of the first segment electrode to become equal to a potential of the common electrode and sets a potential of the second segment electrode to become different from the potential of the common electrode when predetermined information is displayed, and sets each of the potential of the first segment electrode and the potential of the second segment electrode to become different from the potential of the common electrode when the predetermined information is not displayed,
  wherein the control circuit performs settings so that a potential of the auxiliary electrode becomes equal to the potential of the second segment electrode.

One of other aspects of a display device according to the present invention includes:
  a transparent first substrate;
  a transparent second substrate;
  a liquid crystal layer which is formed of a polymer dispersed liquid crystal held between the first substrate and the second substrate;
  a transparent first segment electrode which is formed on the first substrate;
  a transparent second segment electrode which is formed on the first substrate and is formed as a same first layer as the first segment electrode;
  a transparent common electrode which is formed on the second substrate to face the first and second segment electrodes;
  a transparent auxiliary electrode which is formed on the first substrate along a gap between the first and second segment electrodes; and
  a control circuit which sets a potential of the first segment electrode to become equal to a potential of the common electrode and sets a potential of the second segment electrode to become different from the potential of the common electrode when predetermined information is displayed, and sets each of the potential of the first segment electrode and the potential of the second segment electrode to become different from the potential of the common electrode when the predetermined information is not displayed,
  wherein the auxiliary electrode has a floating structure.

One of aspects of a camera according to the present invention includes:
  an optical system which guides a subject image to a finder; and
  a display device which is arranged on an optical path of the subject image guided by the optical system,
  wherein the display device includes:
  a transparent first substrate;
  a transparent second substrate;
  a liquid crystal layer which is formed of a polymer dispersed liquid crystal held between the first substrate and the second substrate;
  a transparent first segment electrode which is formed on the first substrate so that a predetermined area becomes a positive pattern with respect to a predetermined display information;
  a transparent second segment electrode which is formed on the first substrate so that a predetermined area becomes a negative pattern with respect to the predetermined display information, wherein the transparent second segment electrode is formed as a same first layer as the first segment electrode;
  a transparent common electrode which is formed on the second substrate to face the first and second segment electrodes,
  a transparent auxiliary electrode which is formed as a second layer different from the first layer on the first substrate along a gap between the first and second segment electrodes; and
  a transparent insulating film interposed between the first and second layers,
  wherein the auxiliary electrode is connected to the second segment electrode via a contact hole formed in the insulating film.

According to the present invention, a gap between neighboring two segment electrodes can be prevented from being visible as a dark region even if polymer dispersed liquid crystal is used as a liquid crystal layer.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Various embodiments of the present invention will be hereinafter described with reference to the accompanying drawings.

[First Embodiment]

Figure 1:
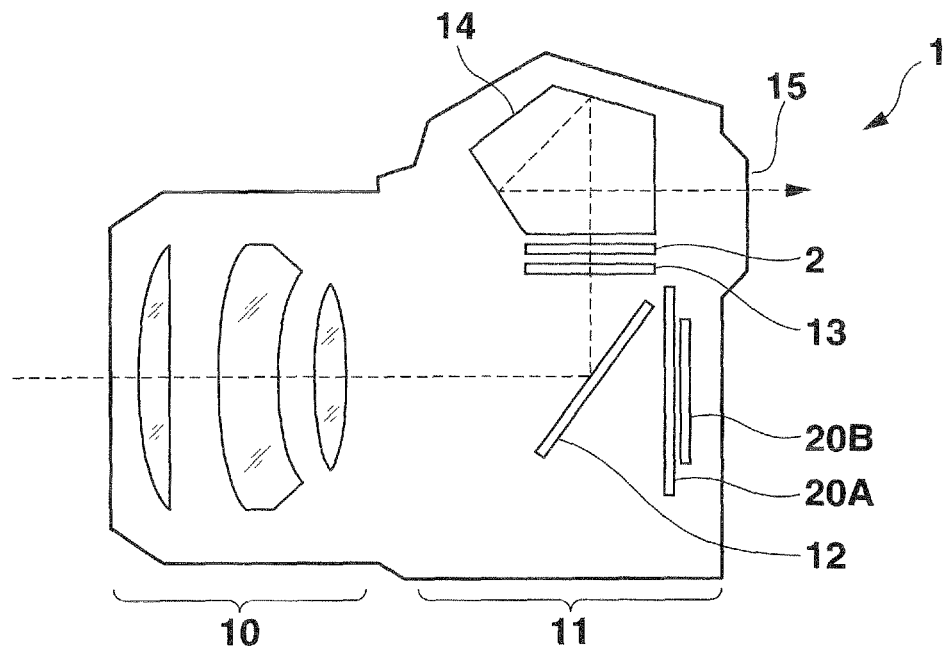
FIG. 1 is a view schematically showing a single-lens reflex camera including a display device according to a first embodiment.

FIG. 1 is a view schematically showing a single-lens reflex camera 1 given as one example of an electronic apparatus including a display device 2 according to a first embodiment of the present invention.

As shown in FIG. 1, in the single-lens reflex camera 1, light from a subject is guided into a camera body 11, and then, reflected by a mirror 12, and thereafter, a real image of the subject is imaged on a focusing glass 13. A subject image given as the real image is guided into a finder 15 by means of a pentagonal prism 14, and thus, observable. A display device 2 according to this embodiment is interposed between the foregoing focusing glass 13 and pentagonal prism 14. The display device 2 displays information in an overlapped state on a subject image reflected on the focusing glass 13. In FIG. 1, the broken line denotes an optical path of light from a subject guided into the finder 15.

Figure 2:
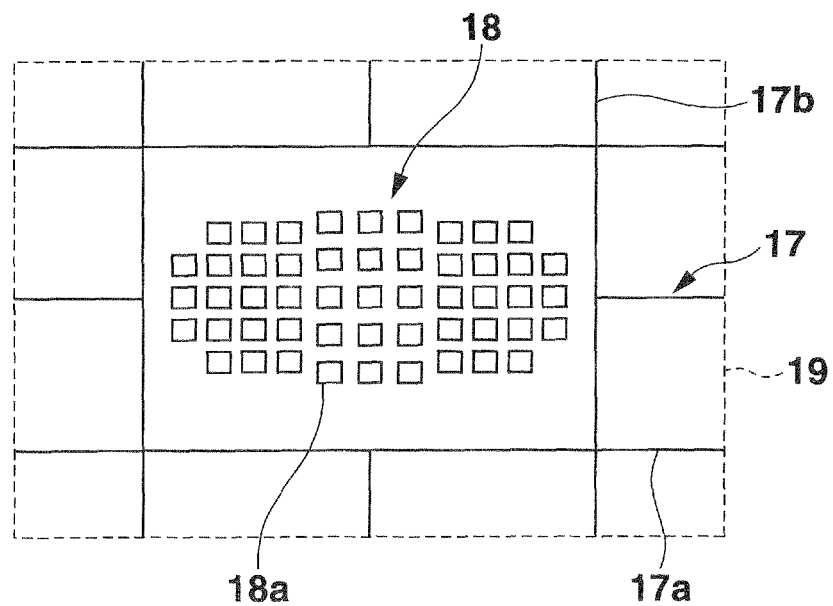
FIG. 2 is a view showing a display example in a finder.

FIG. 2 is a view showing an example of display by a finder. Information overlapped with a real image reflected on the focusing glass 13 includes composition grid information 17 and focus point information 18, for example. The composition grid information 17 is displayed to guide the tilt of the single-lens reflex camera 1 with respect to an imaged subject. As the foregoing composition grid information 17, horizontal and vertical lines 17a and 17b based on the single-lens reflex camera 1 are displayed. Moreover, the focus point information 18 is displayed to give the guide for an area, which is focused to a subject, using frame-like markers 18a for each area. In FIG. 2, 51 markers 18a are displayed as the focus point information 18 at maximum.

In this case, a setting mode of the single-lens reflex camera 1 is changed to an information non-display mode, and thereby, the foregoing composition grid information 17 and focus point information 18 are not displayed. Moreover, the display example of the finder is not limited to the foregoing composition grid information 17 and focus point information 18. For example, camera mode information, residual battery and other information may be displayed.

In the single-lens reflex camera 1, the mirror 12 is moved up to open a shutter 20A, and a subject light is guided to a film or imaging device 20B; in this way, shooting is performed. Therefore, in a mirror-up state, there is provided a structure in which a subject image does not reach the display device 2.

Figure 3:
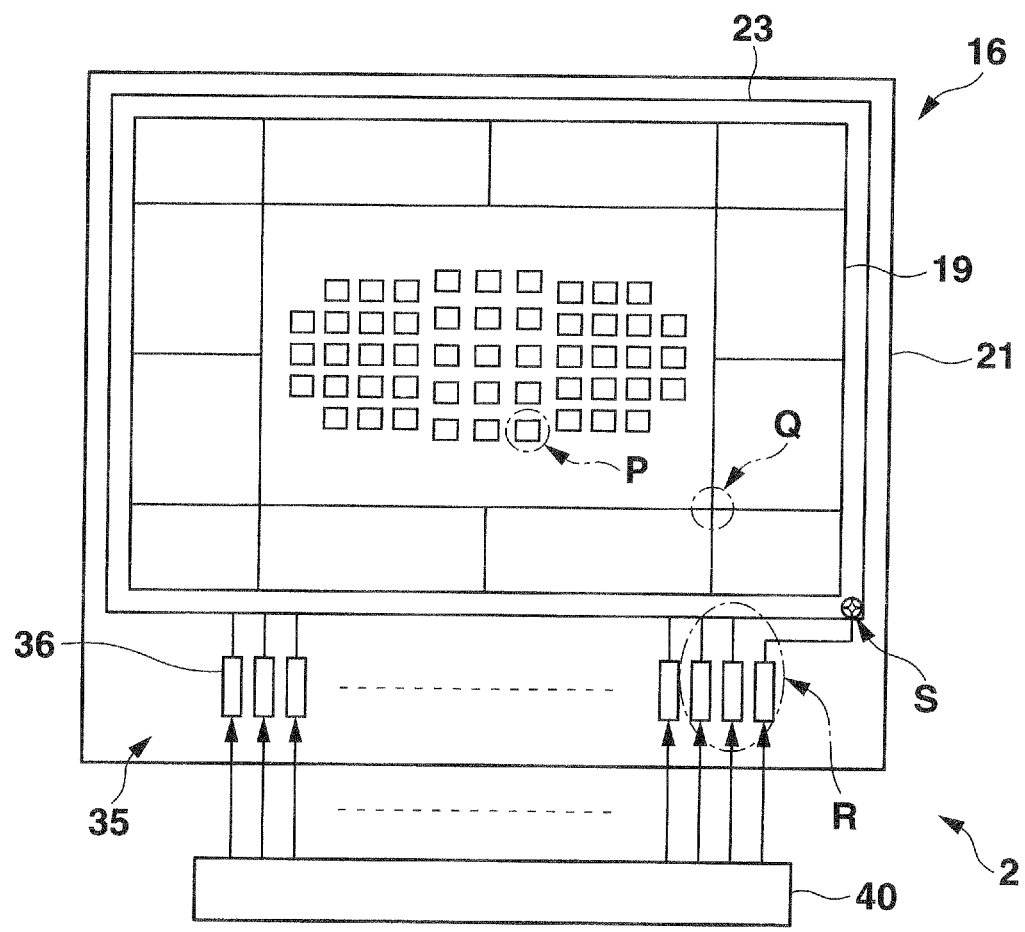
FIG. 3 is a view to explain a display device.
Figure 4:
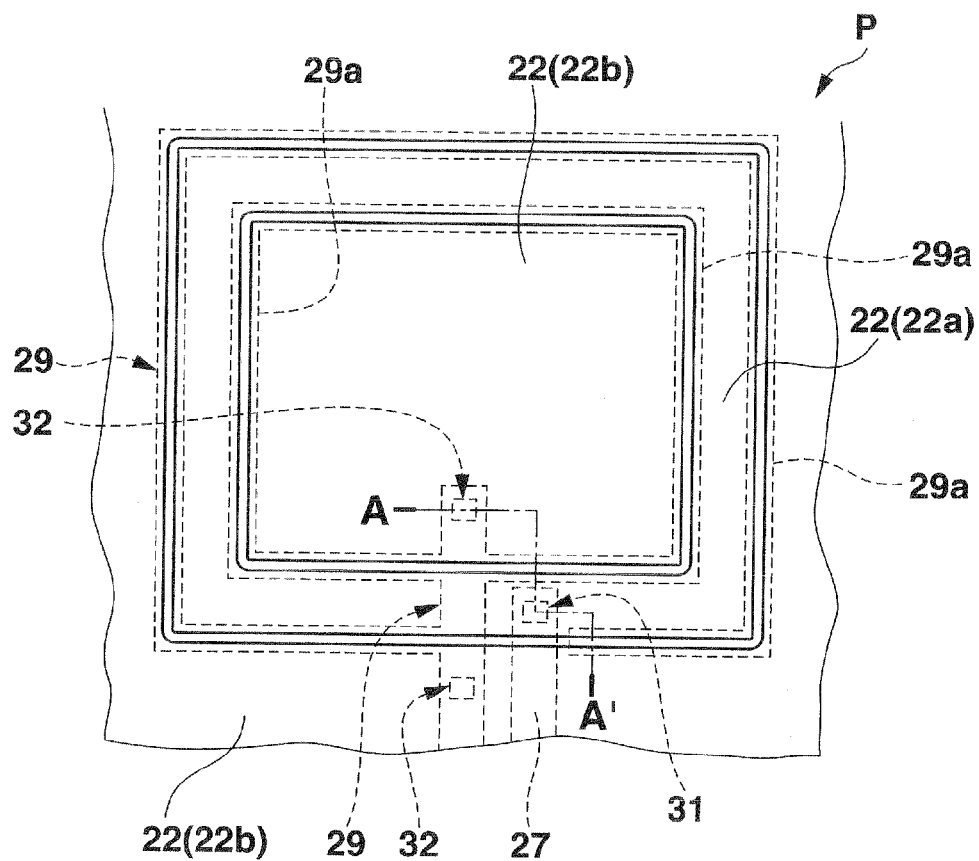
FIG. 4 is a top plan view enlarging an area shown in FIG. 3.
Figure 5:
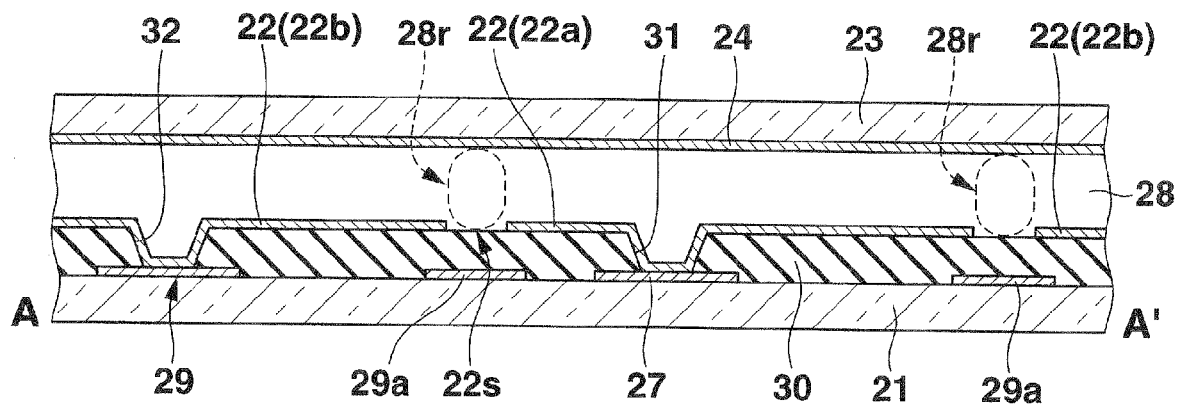
FIG. 5 is a cross-sectional view taken along the line A-A' of FIG. 4.
Figure 6:
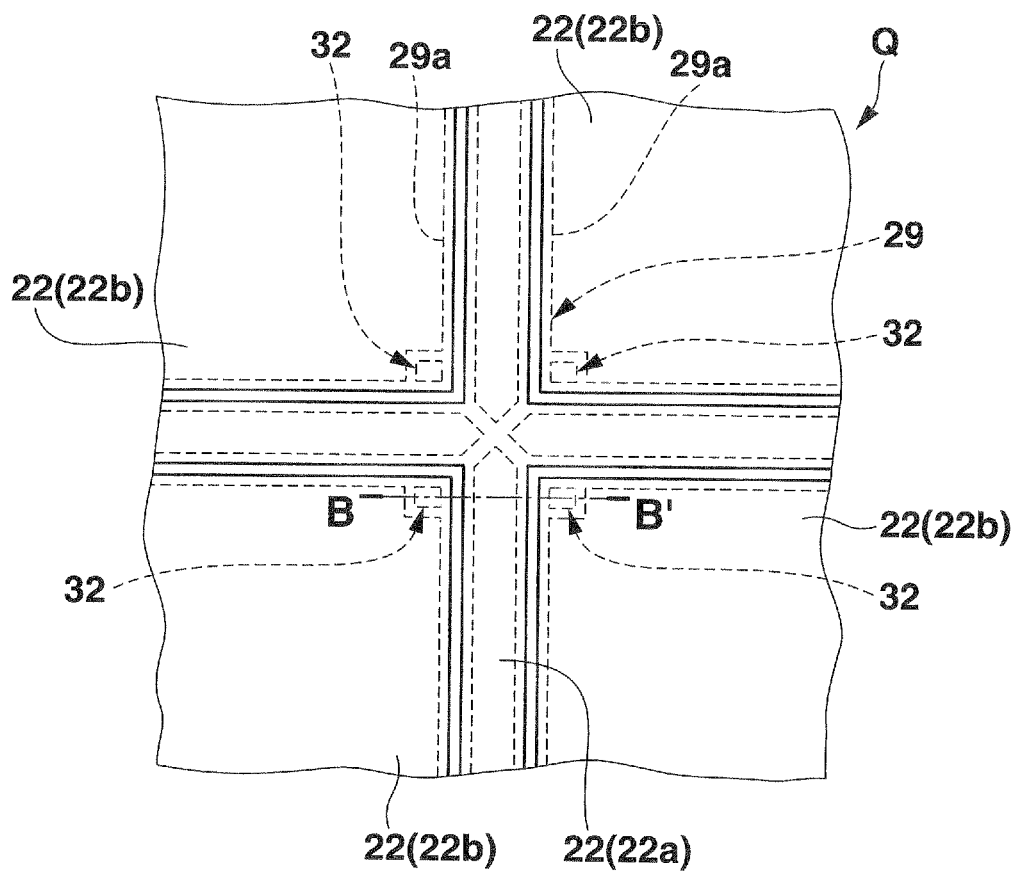
FIG. 6 is a top plan view enlarging an area Q shown in FIG. 3.
Figure 7:
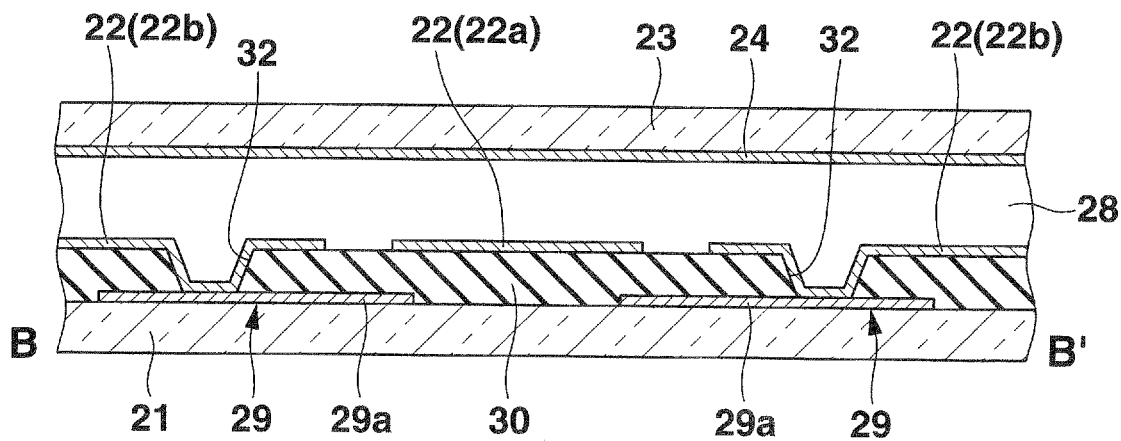
FIG. 7 is a cross-sectional view taken along the line B-B' of FIG. 6.
Figure 8:
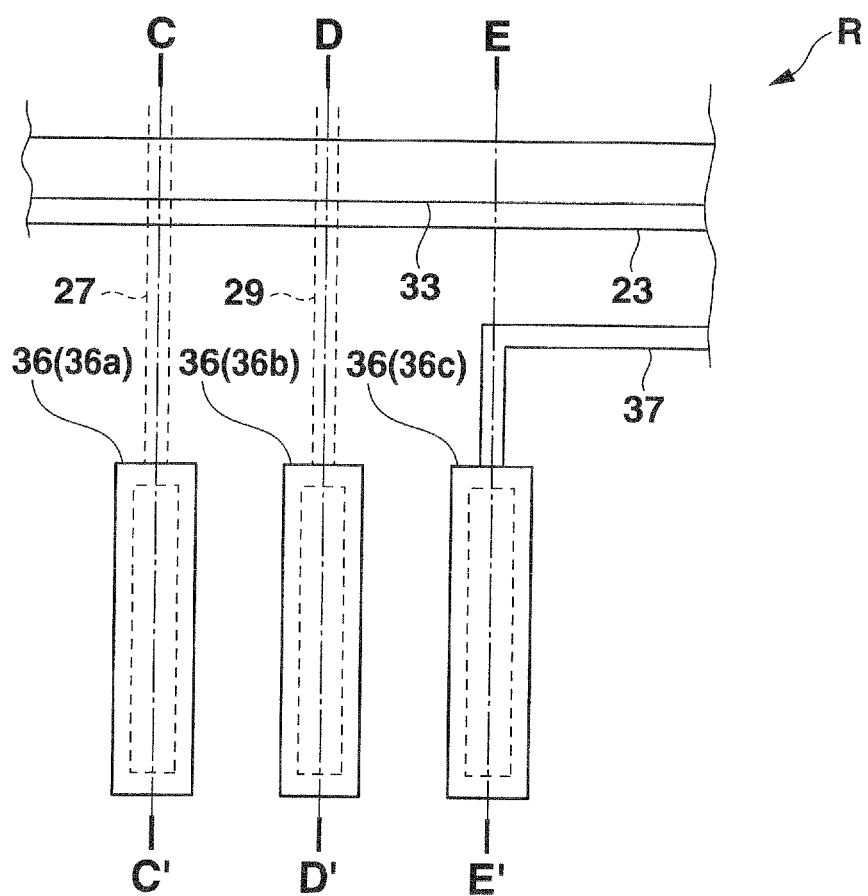
FIG. 8 is a top plan view enlarging an area R shown in FIG. 3.
Figure 9:
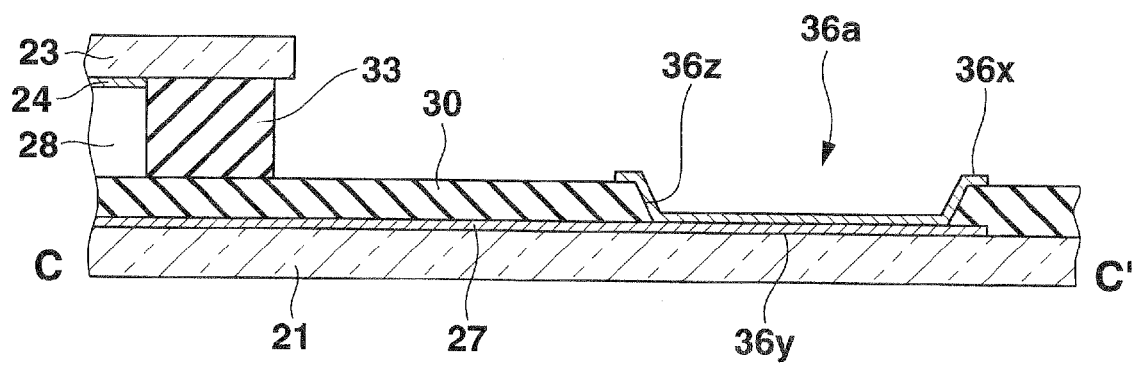
FIG. 9 is a cross-sectional view taken along the line C-C' of FIG. 8.
Figure 10:
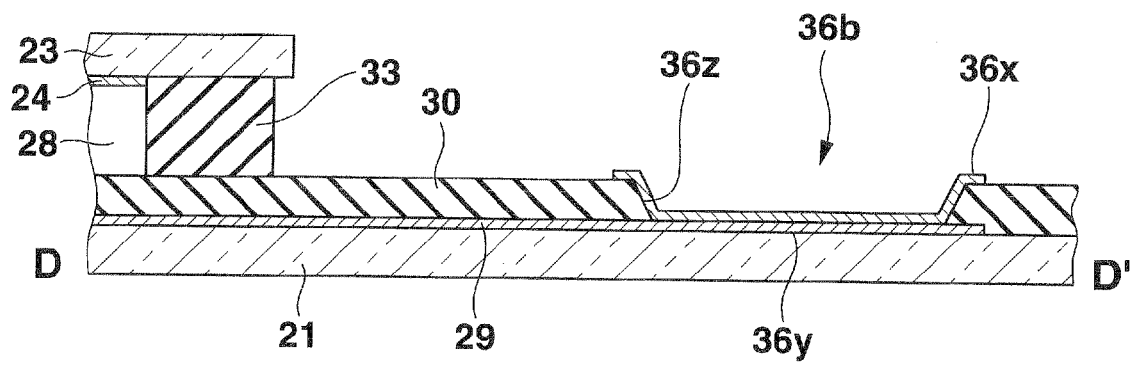
FIG. 10 is a cross-sectional view taken along the line D-D' of FIG. 8.
Figure 11:
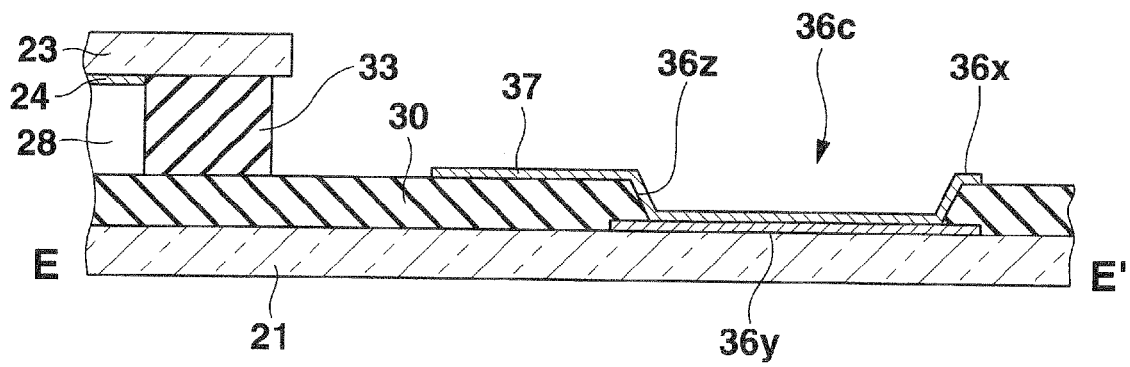
FIG. 11 is a cross-sectional view taken along the line E-E' of FIG. 8.

As can be seen from FIG. 3, the display device 2 includes a liquid crystal panel 16 and a control circuit 40, which drives the liquid crystal panel 16.

As shown in FIGS. 3 to 11, the liquid crystal panel 16 includes a first substrate 21 formed of a transparent insulating material such as glass, and a second substrate 23 formed of the same material as above. A conductive film formed of a transparent conductive material such as indium tin oxide (ITO) is patterned as a plurality of segment electrodes 22 on a display area 19 on the first substrate 21.

The lower-layer side of the segment electrode 22 is provided with a lower-layer interconnect 27, which is extended to set the potential of a segment electrode, and an auxiliary interconnect 29 described later. Namely, the foregoing lower-layer interconnect 27 and auxiliary interconnect 29 on which a conductive film formed of a transparent conductive material such as indium tin oxide (ITO) is patterned are provided as a second layer on the first substrate 21. Moreover, an insulating film 30 formed of a transparent insulating material such as silicon nitride is provided as a third layer on the second layer. Further, the foregoing segment electrode 22 is provided as a first layer on the third layer.

A conductive film formed of a transparent conductive material such as ITO is provided as a common electrode 24 on the second. substrate 23. The second substrate 23 is stuck to the first substrate 21 by means of a gap material (seal) 33 so that each of the segment electrodes 22 on the first substrate 21 faces the common electrode 24 and a predetermined gap is formed between first and second substrates.

Figure 20:
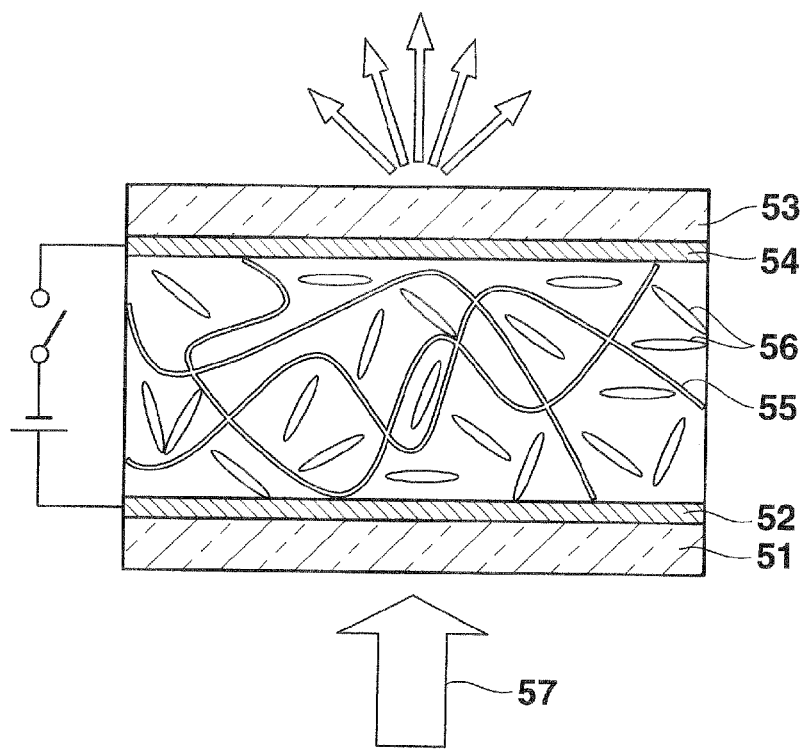
FIG. 20 is a view showing an alignment state of polymer dispersed liquid crystal, that is, a light scattering state.
Figure 21:
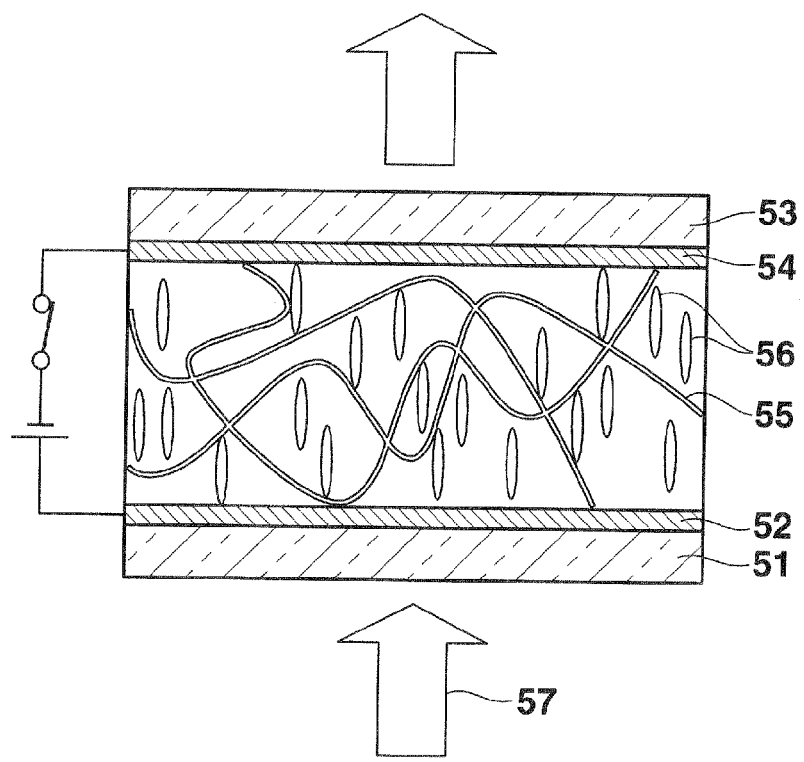
FIG. 21 is a view showing an alignment state of polymer dispersed liquid crystal, that is, a light non-scattering state (light transparent state).

A gap formed between the first and second substrates 21 and 23 is provided as a liquid crystal layer 28. The liquid crystal layer 28 is formed in such a manner that PN liquid crystal given as a polymer dispersed liquid crystal in which liquid crystal molecules having a positive dielectric constant anisotropy are dispersed in PN shown in FIGS. 20 and 21 is sealed in the gap between the foregoing substrates. In this case, the dielectric constant anisotropy liquid crystal molecules dispersed in PN is not limited to positive, and may be negative.

The segment electrodes 22 include a plurality of segment electrodes 22a for displaying the composition grid information 17 and the focus point information 18. Moreover, the segment electrodes 22 are provided with a plurality of segment electrodes 22b independently from the foregoing segment electrodes 22a. These segment electrodes 22b are used for keeping a background area of various information to a transparent state so that a real image given as a subject is easily visible when the user looks into the finder 15 and information is obviously visible. Hereinafter, these segment electrodes 22a and 22b are expressed as follows so that they are easily distinguished. Namely, the segment electrode 22a for displaying various types of information is expressed as character electrode 22a, and the segment electrode 22b for keeping a background area of various types of information in a transparent state is expressed as a non-character electrode 22b.

Although the details will be described later, the liquid crystal panel 16 executes the following control, and thereby, performs display so that information is overlapped with a subject reflected on the focusing glass 13. According to the foregoing control, the liquid crystal layer 28 of an area corresponding to the character electrode 22a is controlled to a cloudy state (light scattering state). Simultaneously, the liquid crystal layer 28 of an area corresponding to the non-character electrode 22b is controlled to a transparent state (light non-scattering state). Therefore, principle, the character electrode 22a is arranged to be adjacent to the non-character electrode 22b. In other words, the segment electrode 22 has a character electrode 22a formed into a positive pattern and a character electrode 22a formed into a negative pattern with respect to information displayed on the display area of the liquid crystal panel 16.

Each of the character electrodes 22a is connected to the lower-layer interconnect 27 by means of a first contact hole 31 formed on an insulating film 30. Moreover, each of the character electrodes 22b is connected to the auxiliary interconnect 29 by means of a second contact hole 32 formed on the insulating film 30.

In this case, each of the character electrodes 22a is connected to a mutually different lower-layer interconnect 27 so that the potential is independently settable. Moreover, each of the character electrodes 22b is connected in common by means of the auxiliary interconnect 29 so that the potentials become equal to each other.

Therefore, in the liquid crystal panel 16, a segment formed of PN liquid crystal is formed for each character electrode 22a, and only one segment corresponding to the non-character electrodes 22b is formed.

The auxiliary interconnect 29 mutually connects a plurality of non-character electrodes 22b. Moreover, the auxiliary interconnect 29 extends along a gap 22s between mutually neighboring two segment electrodes, that is, between character and non-character electrodes 22a and 22b. In this way, the auxiliary interconnect 29 has an auxiliary electrode 29a, which is arranged to close the foregoing gap 22s when viewed in a plane.

The auxiliary electrode 29 is formed having a width wider than the width of the gap 22s. In this case, preferably, the auxiliary electrode 29 is formed having a width as close to the gap 22 as possible considering a pattern precision with the segment electrode 22. Specifically, the insulating film 30 given as the third layer is formed thinner about one digit than the liquid crystal layer 28 and is formed in the order of about several hundred of nanometers. For this reason, if the segment electrode 22 given as the first layer is overlapped with the auxiliary interconnect 29 given as the second layer, multiple interference of light is generated based on the difference in a refractive index between these first and second layers and the third layer. Thus, this is a factor causing an unnecessary reduction in the transmittance of light.

As can be seen from FIG. 3, the first substrate 21 is formed having one size larger than the second substrate 23, Further, the first substrate 21 is stuck to the second substrate 23 so that a part of the first substrate 21 is exposed from the second substrate 23. An exposed area 35 is provided with a plurality of terminals 36 for connecting the foregoing segment electrode 22, auxiliary interconnect 29 and common electrode 24 to a control circuit 40.

Each of the foregoing terminals 36 includes an upper-layer terminal part 36x formed as the foregoing first layer and a lower-layer part 36y formed as the foregoing second layer. These parts 36x and 36y are connected by means of a third contact hole formed on the insulating film 30.

The terminal 36a to be connected to the character electrode 22a is configured so that the lower-layer terminal part 36y is integrally formed with the lower-layer interconnect 27. Moreover, the terminal 36b to be connected to the non-character electrode 22b is configured so that the lower-layer terminal part 36y is integrally formed with the auxiliary interconnect 29. In addition, a common interconnect 37 integrally formed with the upper-layer terminal part 36x is extended to an area S provided with a conductive paste. In this way, a terminal 36c to be connected to the common electrode 24 is connected to the common electrode 24 in the foregoing area S by means of the foregoing conductive paste. The control circuit 40 may be configured to be mounted on an area 35 provided with terminals 36 using chip on glass (COG) correspondingly to each terminal 36.

Figure 12:
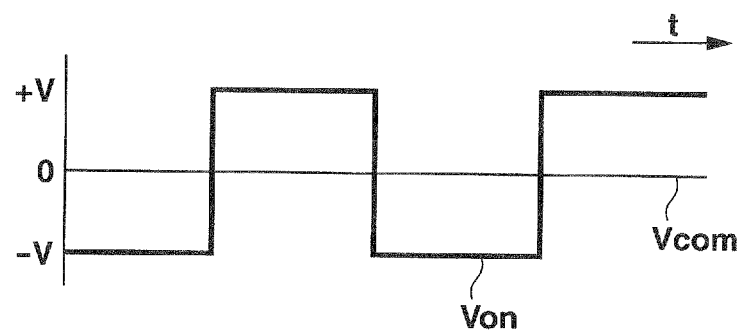
FIG. 12 is a view to explain a common signal and a display signal.

Hereinafter, the operation of the liquid crystal panel 16 driven by means of the control circuit 40 via the terminals 36 will be described. Upon supply of power to the single-lens reflex camera 1, the control circuit 40 starts a binary static drive with respect to the liquid crystal panel 16 for every segment. For example, as shown in FIG. 12, the control circuit 40 supplies a common signal Vcom to the common electrode 24 via the terminal 36c. In this case, the common signal Vcom may be a direct-current signal or rectangular alternating-current signal. In order to simplify the following description, the potential of the common signal Vcom is regularized to a reference voltage (0V).

Figure 13:
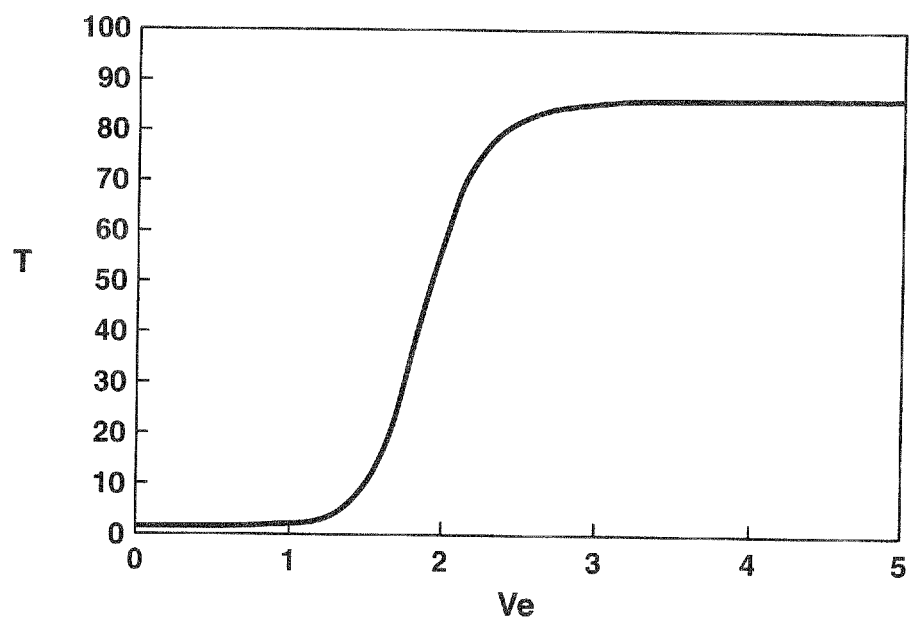
FIG. 13 is a graph to explain the relationship between an effective voltage-transmittance characteristic of polymer dispersed liquid crystal.

Then, the control circuit 40 supplies a display signal Von to the non-character electrode 22b via the terminal 36b and the auxiliary interconnect 29 in order. A first display signal Von is a signal in which the polarity with respect to the common signal Vcom is changed at a predetermined period, and an absolute value (effective voltage Ve) of the potential difference between the display signal von and the common signal Vcom is set constant. Specifically, the characteristic of the liquid crystal sealed in the liquid crystal panel 16 as the liquid crystal layer has the relationship (i.e., Ve-T characteristic) between an effective voltage and a transmittance characteristic shown in FIG. 13, for example. In this case, the foregoing effective voltage Ve is more than about 3 , and thus, a fixed display signal Von is supplied. In other words, the control circuit 40 performs control such that a segment corresponding to the non-character electrode 22b acquires a transparent state.

On the other hand, any one of common signal Vcom and display signal Von is individually selected, and then, supplied to each of character electrodes 22a for every character electrode 22a in accordance with the operation state of the single-lens reflex camera 1. For example, when the single-lens reflex camera 1 is in the following operation state, the control circuit 40 supplies a common signal Vcom to each of character electrodes 22a. According to the foregoing operation state, all of horizontal and vertical lines 17a and 17b given as the composition grid information 17 and all of markers 18a given as the focus point information 18 are displayed. Namely, the control circuit 40 sets the potential difference between the character electrode 22a and the common electrode 24 to 0V. In this way, the control circuit 40 performs control so that a segment corresponding to the character electrode 22a acquires a cloudy state (dark state). As described above, the liquid crystal panel 16 is driven by means of the control circuit 40, and thereby, the information overlapped with a subject image is visibly displayed on the display area 19 of the liquid crystal panel.

Moreover, for example, when a setting mode of the single-lens reflex camera 1 is the foregoing information non-display mode, the control circuit 40 supplies a display signal Von to each of the character electrodes 22a. Namely, the control circuit 40 performs control so that a segment corresponding to each of the character electrodes 22a is in a transparent state. In this case, a segment corresponding to each of the non-character electrodes 22a is in a transparent state; therefore, all areas of the display area 19 of the liquid crystal panel 16 acquire a transparent state.

According to this embodiment, the foregoing character and non-character electrodes 22a and 22b are formed as the same layer. Therefore, the display characteristic is made coincident between a segment corresponding to the character electrodes 22a and a segment corresponding to the non-character electrodes 22b. As a result, the entire display area is set to a uniform transparent state.

In addition, according to this embodiment, the auxiliary interconnect 29 set to the same potential as the non-character electrode 22b has an auxiliary electrode 29a, which extends along the gap 22s between character and non-character electrodes 22a and 22b. Therefore, a voltage is applied to a liquid crystal 28r corresponding to the gap 22s; as a result, this area is brought close to a transparent state.

Figure 14:
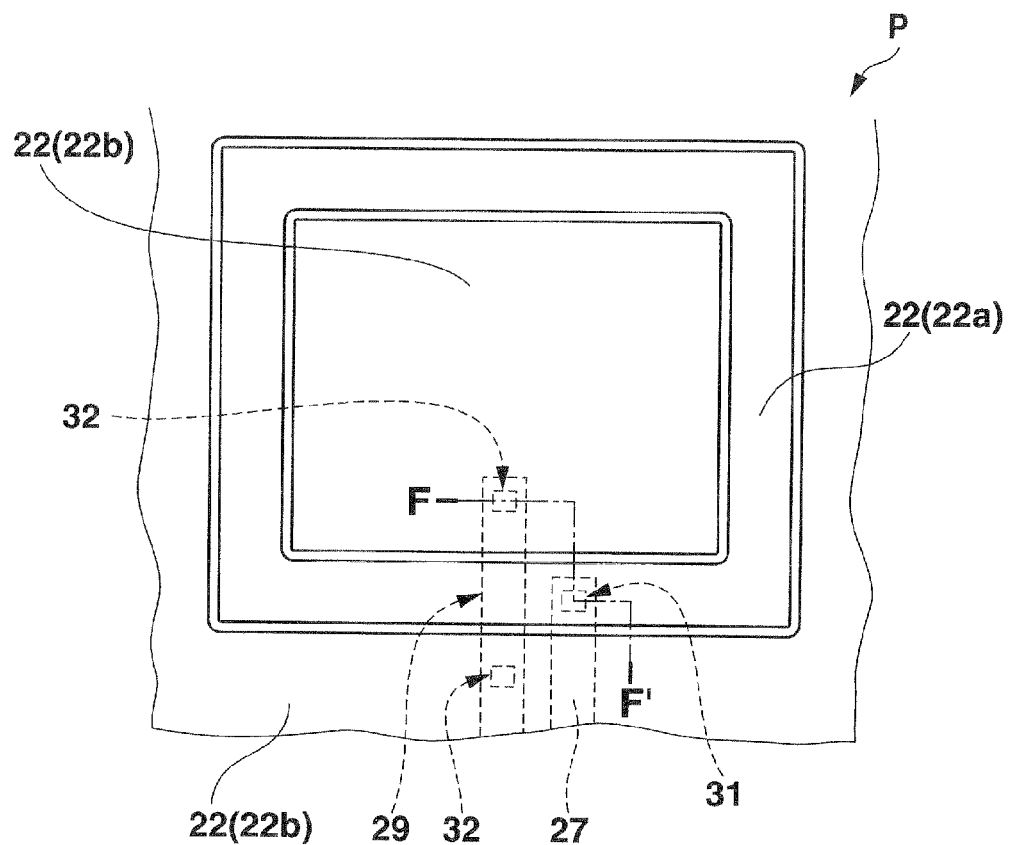
FIG. 14 is a top plan view showing a part of a liquid crystal panel given as a comparative example.
Figure 15:
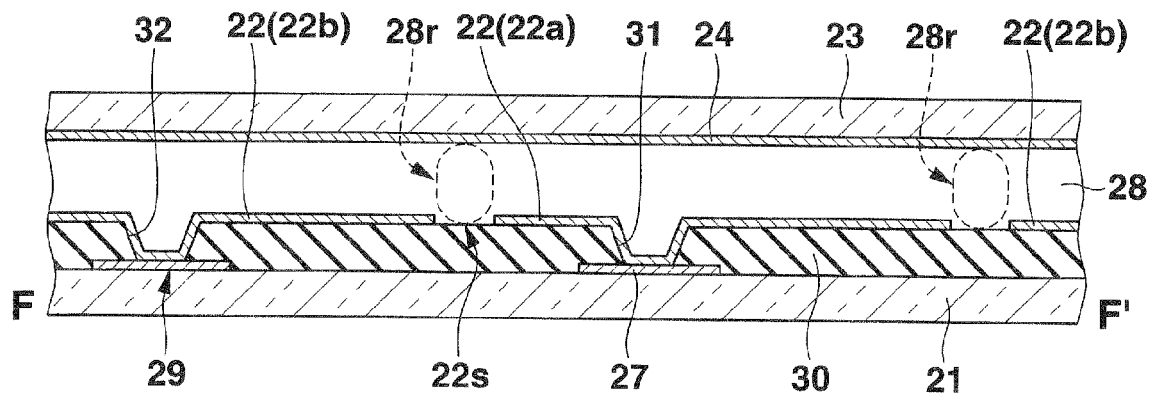
FIG. 15 is a cross-sectional view taken along the line F-F' of FIG. 14.

FIGS. 14 and 15 show a comparative example. As shown in FIGS. 14 and 15, in a liquid crystal panel having no auxiliary electrode 29a, a voltage is not applied to a liquid crystal layer 28r corresponding to a gap 22s. For this reason, an area to which a voltage is not applied is visible as a cloudy state (dark state); as a result, there is a problem of reducing the display quality. In contrast to the foregoing comparative example, in the liquid crystal panel 16 this embodiment, a voltage is applied to the liquid crystal layer 28r corresponding to the gap 22s by means of the auxiliary electrode 29. Therefore, it is possible to prevent the foregoing problem.

An insulating film 30 having a predetermined thickness is formed between the auxiliary electrode 29a and the liquid crystal 28. Therefore, an attenuated effective voltage Vr is applied to an area of the liquid crystal layer 28r corresponding to the gap 22s in accordance with the thickness and dielectric constant of the insulating film 30. Preferably, the display signal Von is set as a signal, which is capable of making high an effective voltage Ve so that the liquid crystal layer 28r of the area corresponding to the gap 22s acquires a sufficiently transparent state.

For example, the following assumption is given. Specifically, the dielectric constant of the insulating film 30 is equal to a dielectric constant (the average value of parallel and perpendicular dielectric constants of liquid crystal molecules) of the liquid crystal layer. Further, the thickness of the liquid crystal layer 28 is about ten times as much as that of the insulating film 30. In this case, an effective voltage Vr applied to the liquid crystal layer 28r of the area corresponding to the gap 22s is reduced by about 10% compared with an effective voltage Ve applied to the liquid crystal layer 28 corresponding to the non-character electrode 22b.

Therefore, in such a case, preferably, a display signal Von to which is previously added a voltage corresponding to the considering a reduction of 10% is supplied to the non-character electrode 22b. Namely, when the effective voltage Ve applied to the liquid crystal layer 28r corresponding to the non-character electrode 22b is more than 3.0 [V], the liquid crystal layer 28 of the corresponding area acquires a sufficiently transparent state. In this case, preferably, a display signal von is supplied so that an effective voltage Ve of 3.3 [V] or more is applied to the liquid crystal layer 28 of the foregoing area at the minimum.

According to the foregoing embodiment, the lower-layer interconnect 27 and the auxiliary interconnect 29 are formed as the same layer. The foregoing lower-layer interconnect 27 and auxiliary interconnect 29 may be formed as mutually different layers.

Figure 16:
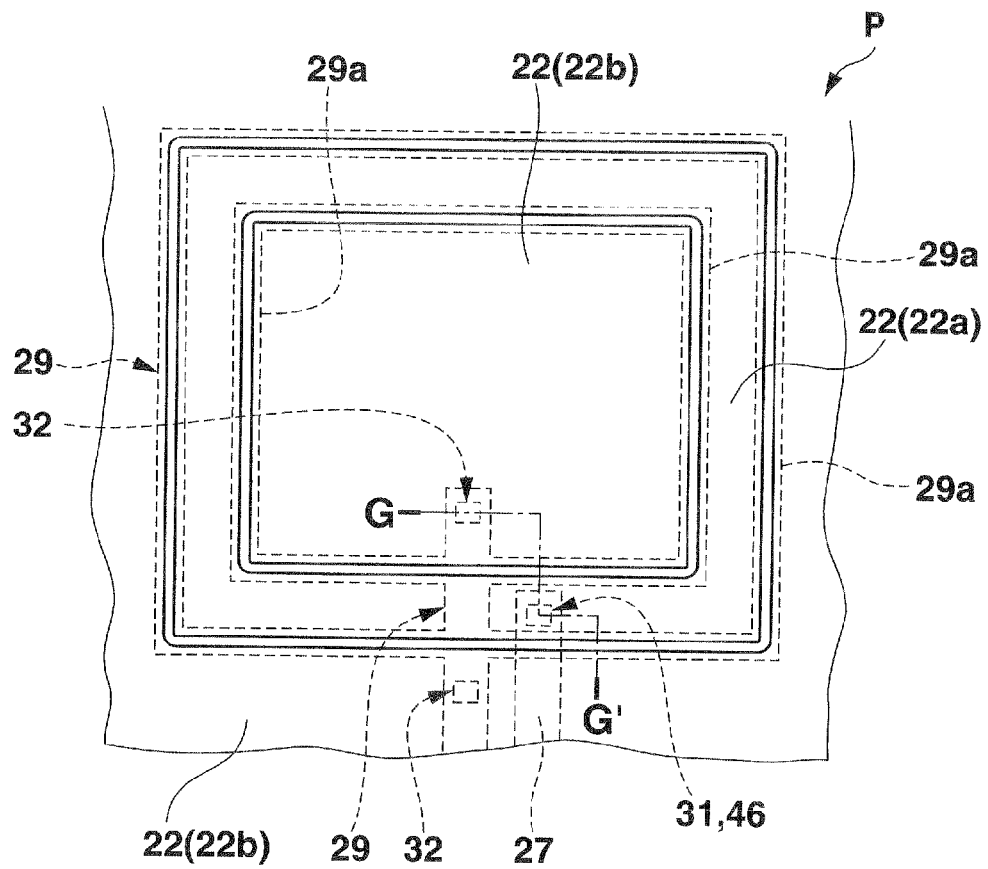
FIG. 16 is a top plan view showing a part of a liquid crystal panel according to a modification example of a first embodiment.
Figure 17:
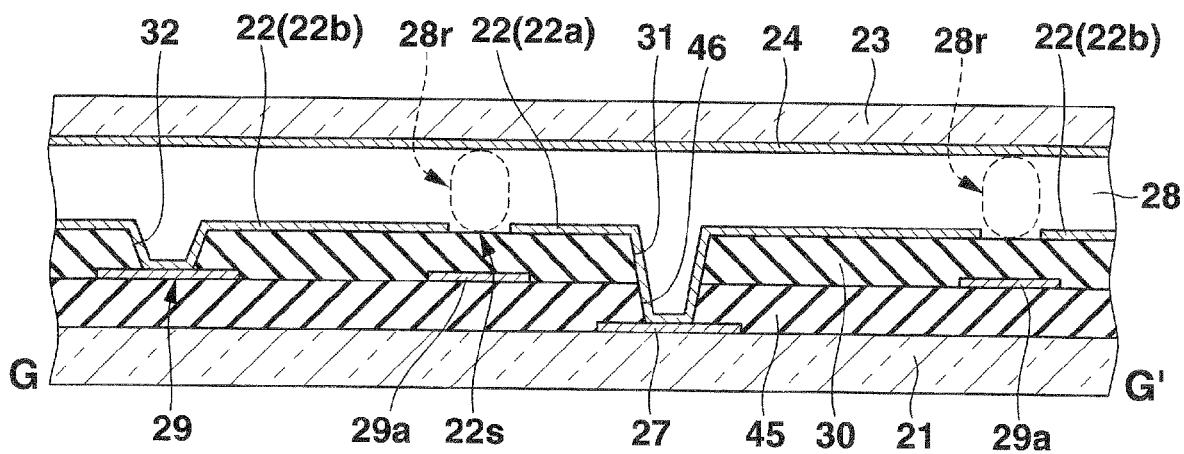
FIG. 17 is a cross-sectional view taken along the line G-G' of FIG. 16.

In this case, the lower-layer interconnect 27 is formed as shown. in FIGS. 16 and 17. Specifically, the lower-layer interconnect 27 is formed under the auxiliary interconnect 29 (i.e., layer on the side far from the liquid crystal layer) so that an insulating film 45 formed of an insulating material such as silicon nitride is interposed between the foregoing interconnects 27 and 29. Therefore, the auxiliary electrode 29a is continuously formed with respect to the gap 22s, and further, it is possible to prevent an effective voltage Vr applied to the liquid crystal layer 28r of the area corresponding to the gap 22s from being reduced. In this case, the foregoing insulating film 45 is provided with a fourth contact hole 46, which communicates with the first contact hole 31 in order to make a connection between the lower-layer interconnect 27 and the character electrode 22a.

[Second Embodiment]

Hereinafter, a second embodiment will be described. According to the first embodiment, in the liquid crystal panel, the auxiliary electrode connected to the non-character electrode so that it is set to the same potential as the non-character electrode. According to this second embodiment, an auxiliary electrode is formed having a floating structure. In this case, the same numbers are used to designate portions corresponding to the foregoing first embodiment, and the details are omitted.

Figure 18:
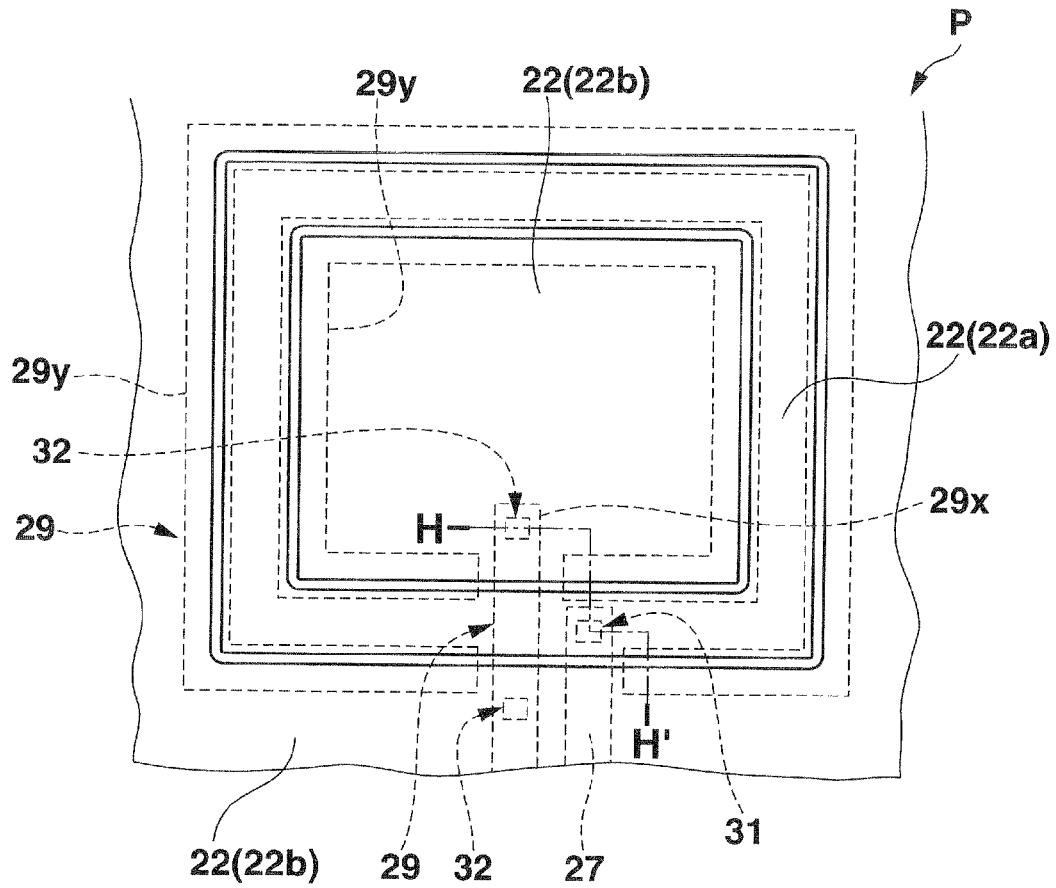
FIG. 18 is a top plan view showing a part of a liquid crystal panel according to a second embodiment.
Figure 19:
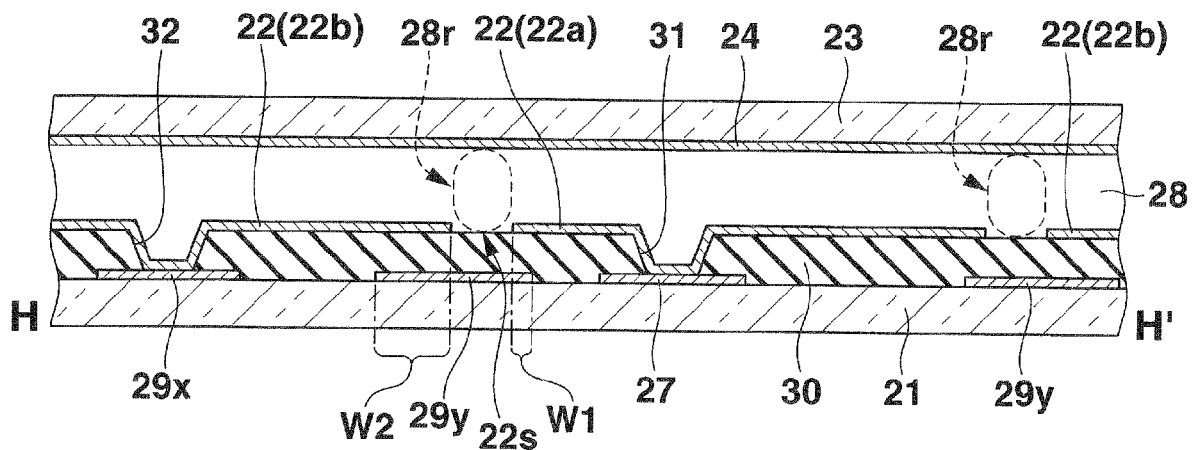
FIG. 19 is a cross-sectional view taken along the line H-H' of FIG. 18.

FIG. 18 is a top plan view enlarging an area P shown in FIG. 3 in a liquid crystal panel according to a second embodiment. FIG. 19 is a cross-sectional view taken along the line H-H' of FIG. 18.

As can be seen from FIGS. 18 and 19, according to this embodiment, an auxiliary interconnect 29 has a connection interconnect 29x and an auxiliary electrode 29y. The connection interconnect 29x mutually connects a plurality of non-character electrodes 22b. In this case, the connection interconnect 29x is formed integrally with the lower-layer terminal 36y in the terminal 36b shown in FIG. 8.

Moreover, the auxiliary electrode 29y extends along a gap 22s between mutually neighboring two segment electrodes 22, that is, a gap 22s between character and non-character electrodes 22a and 22h. In this way, the auxiliary electrode 29y is arranged to close the gap 22s when viewed in a plane.

Further, the auxiliary electrode 29y is separated from the connection interconnect 29x, and thereby, a floating structure is provided. Moreover, the auxiliary electrode 29y is formed so that an overlapping width W2 with the non-character electrode 22b becomes larger than an overlapping width W1 with the character electrode 22a in the widthwise direction of the auxiliary electrode 29y.

Namely, the auxiliary electrode 29y is formed so that an overlapping area with the non-character electrode 22b becomes larger than an overlapping area with the character electrode 22a. In this way, regarding the degree of influence on the potential of the auxiliary electrode 29y, the potential set to the non-character electrode 22b becomes larger than the potential set to the character electrode 22a.

Therefore, a voltage corresponding to the potential set to the non-character electrode 22b is applied to a liquid crystal layer 28 corresponding to the gap 22s by means of the auxiliary electrode 29y. In this case, the potential set to the non-character electrode 22b is a potential which is capable of making transparent the liquid crystal layer 28. Therefore, the liquid crystal layer 28 corresponding to the gap 22s is controllable to a relatively transparent state regardless of the potential set to the character electrode 22a.

As the first embodiment, according to the second embodiment, preferably, a display signal Von is set as a signal which is capable to making high an effective voltage Ve so that a liquid crystal layer 28r of an area corresponding to the gap 22s acquires a sufficiently transparent state.

The present invention is not limited to the foregoing embodiments. Constituent components may be modified and embodied within a scope diverging from the subject matter of the invention in inventive step. For example, the display device may be applied to a single-les reflex camera; in this case, the display device is applicable to other apparatuses, of course.

A plurality of constituent components disclosed in the foregoing embodiments may be properly combined, and thereby, various inventions are formable. For example, even if some constituent components are deleted from all constituent components shown in the foregoing embodiments, it is possible to solve the problem described in the column of "Description of the Related Art". Moreover, as long as the effect of the invention is obtained, the configuration of omitting constituent components may be extracted as an invention.

What is claimed is:

1. A display device comprising:
   a transparent first substrate;
   a transparent second substrate;
   a liquid crystal layer which is formed of a polymer dispersed liquid crystal held between the first substrate and the second substrate;
   a transparent first segment electrode which is formed on the first substrate so that a predetermined area becomes a positive pattern with respect to a predetermined display information;
   a transparent second segment electrode which is formed on the first substrate so that a predetermined area becomes a negative pattern with respect to the predetermined display information, wherein the transparent second segment electrode is formed as a same first layer as the first segment electrode;
   a transparent common electrode which is formed on the second substrate to face the first and second segment electrodes;
   a transparent auxiliary electrode which is formed as a second layer different from the first layer on the first substrate along a gap between the first and second segment electrodes; and
   a transparent insulating film interposed between the first and second layers,
   wherein the auxiliary electrode is connected to the second segment electrode via a contact hole formed in the insulating film.

2. The display device according to claim 1, wherein the auxiliary electrode formed as the second layer is farther than the first layer from the liquid crystal layer, and is formed having a width wider than the gap.

3. The display device according to claim 2, wherein the auxiliary electrode is formed so that it is overlapped with the gap.

4. The display device according to claim 1, wherein the auxiliary electrode is set to the same potential as the second segment electrode.

5. The display device according to claim 2, wherein the auxiliary electrode is formed so that an overlapping width with the second segment electrode becomes larger than an overlapping width with the first segment electrode in a widthwise direction of the auxiliary electrode.

6. The display device according to claim 4, further comprising:
   a control circuit which sets a potential for making the liquid crystal layer of an area corresponding to the gap between the first and second segment electrodes transparent by means of the auxiliary electrode.

7. The display device according to claim 1, further comprising:
   a control circuit which supplies via the auxiliary electrode a display signal for making the liquid crystal layer of an area corresponding to the second segment electrode transparent.

8. The display device according to claim 1, wherein the liquid crystal layer changes from a light scattering state to a light transparent state as an applied voltage becomes high.

9. A display device comprising:
   a transparent first substrate;
   a transparent second substrate;
   a liquid crystal layer which is formed of a polymer dispersed liquid crystal held between the first substrate and the second substrate;
   a transparent first segment electrode which is formed on the first substrate;
   a transparent second segment electrode which is formed on the first substrate and is formed as a same first layer as the first segment electrode;
   a transparent common electrode which is formed on the second substrate to face the first and second segment electrodes;
   a transparent auxiliary electrode which is formed on the first substrate along a gap between the first and second segment electrodes; and
   a control circuit which sets a potential of the first segment electrode to become equal to a potential of the common electrode and sets a potential of the second segment electrode to become different from the potential of the common electrode when predetermined information is displayed, and sets each of the potential of the first segment electrode and the potential of the second segment electrode to become different from the potential of the common electrode when the predetermined information is not displayed, wherein the control circuit performs settings so that a potential of the auxiliary electrode becomes equal to the potential of the second segment electrode.

10. The display device according to claim 9, wherein the control circuit performs settings so that the potential of the first segment electrode and the potential of the second segment electrode become equal to each other when the predetermined information is not displayed.

11. The display device according to claim 9, wherein the auxiliary electrode is formed as a second layer which is farther than the first layer from the liquid crystal layer, and is formed having a width wider than the gap.

12. The display device according to claim 9, wherein the auxiliary electrode is formed so that it is overlapped with the gap.

13. The display device according to claim 9, wherein the liquid crystal layer changes from a light scattering state to a light transparent state as an applied voltage becomes high.

14. A display device comprising:
a transparent first substrate;
a transparent second substrate;
a liquid crystal layer which is formed of a polymer dispersed liquid crystal held between the first substrate and the second substrate;
a transparent first segment electrode which is formed on the first substrate;
a transparent second segment electrode which is formed on the first substrate and is formed as a same first layer as the first segment electrode;
a transparent common electrode which is formed on the second substrate to face the first and second segment electrodes;
a transparent auxiliary electrode which is formed on the first substrate along a gap between the first and second segment electrodes; and
a control circuit which sets a potential of the first segment electrode to become equal to a potential of the common electrode and sets a potential of the second segment electrode to become different from the potential of the common electrode when predetermined information is displayed, and sets each of the potential of the first segment electrode and the potential of the second segment electrode to become different from the potential of the common electrode when the predetermined information is not displayed,
wherein the auxiliary electrode has a floating structure.

15. The display device according to claim 14, wherein the auxiliary electrode is formed so that an overlapping width with the second segment electrode becomes larger than an overlapping width with the first segment electrode in a widthwise direction of the auxiliary electrode.

16. The display device according to claim 15, wherein the auxiliary electrode is formed as a second layer which is farther than the first layer from the liquid crystal layer, and is formed having a width wider than the gap.

17. A camera comprising:
an optical system which guides a subject image to a finder; and
a display device which is arranged on an optical path of the subject image guided by the optical system,
wherein the display device comprises:
a transparent first substrate;
a transparent second substrate;
a liquid crystal layer which is formed of a polymer dispersed liquid crystal held between the first substrate and the second substrate;
a transparent first segment electrode which is formed on the first substrate so that a predetermined area becomes a positive pattern with respect to a predetermined display information;
a transparent second segment electrode which is formed on the first substrate so that a predetermined area becomes a negative pattern with respect to the predetermined display information, wherein the transparent second segment electrode is formed as a same first layer as the first segment electrode;
a transparent common electrode which is formed on the second substrate to face the first and second segment electrodes,
a transparent auxiliary electrode which is formed as a second layer different from the first layer on the first substrate along a gap between the first and second segment electrodes; and
a transparent insulating film interposed between the first and second layers,
wherein the auxiliary electrode is connected to the second segment electrode via a contact hole formed in the insulating film.

18. The camera according to claim 17, wherein the predetermined display information is composition grid information or focus point information.

* * * * *